United States Patent
Kjelstrup et al.

(10) Patent No.: US 11,968,241 B1
(45) Date of Patent: Apr. 23, 2024

(54) AUTO-TUNING PERMISSIONS USING A LEARNING MODE

(71) Applicant: Amazon Technologies, Inc., Seattle, WA (US)

(72) Inventors: Jacob A. Kjelstrup, Burien, WA (US); Bharath Mukkati Prakash, Bellevue, WA (US); Brigid Ann Johnson, Seattle, WA (US); Ujjwal Rajkumar Pugalia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1044 days.

(21) Appl. No.: 16/453,931

(22) Filed: Jun. 26, 2019

(51) Int. Cl.
*H04L 9/40* (2022.01)
*G06N 20/00* (2019.01)

(52) U.S. Cl.
CPC ........... *H04L 63/205* (2013.01); *G06N 20/00* (2019.01); *H04L 63/105* (2013.01)

(58) Field of Classification Search
CPC ...... H04L 63/205; H04L 63/105; G06N 20/00
USPC .......................................................... 726/1
See application file for complete search history.

(56) References Cited

U.S. PATENT DOCUMENTS

| | | | |
|---|---|---|---|
| 7,398,308 B2 | 7/2008 | Friedel et al. | |
| 7,685,632 B2 | 3/2010 | Vayman | |
| 7,904,956 B2 | 3/2011 | Golan et al. | |
| 8,146,160 B2 * | 3/2012 | Orr | H04L 63/08 713/168 |
| 8,402,514 B1 | 3/2013 | Thompson et al. | |
| 8,578,487 B2 * | 11/2013 | Soeder | G06F 21/554 726/1 |
| 8,918,834 B1 * | 12/2014 | Samuelsson | H04L 63/20 726/1 |
| 8,955,038 B2 | 2/2015 | Nicodemus et al. | |
| 9,413,778 B1 * | 8/2016 | Elisha | G06F 21/6236 |
| 9,665,733 B1 | 5/2017 | Sills et al. | |
| 9,892,279 B2 | 2/2018 | Petkovic et al. | |
| 9,923,918 B2 | 3/2018 | Nicodemus et al. | |
| 10,122,757 B1 | 11/2018 | Kruse et al. | |
| 2005/0076121 A1 * | 4/2005 | Kortum | H04L 63/20 709/225 |
| 2007/0113270 A1 * | 5/2007 | Kraemer | G06F 21/604 726/4 |
| 2008/0127292 A1 * | 5/2008 | Cooper | G06F 21/6281 718/1 |

(Continued)

*Primary Examiner* — Teshome Hailu
(74) *Attorney, Agent, or Firm* — Robert C. Kowert; Kowert, Hood, Munyon, Rankin & Goetzel, P.C.

(57) ABSTRACT

Methods, systems, and computer-readable media for auto-tuning permissions using a learning mode are disclosed. A plurality of access requests to a plurality of services and resources by an application are determined during execution of the application in a learning mode in a pre-production environment. The plurality of services and resources are hosted in a multi-tenant provider network. A subset of the services and resources that were used by the application during the learning mode are determined. An access control policy is generated that permits access to the subset of the services and resources used by the application during the learning mode. The access control policy is attached to a role associated with the application to permit access to the subset of the services and resources in a production environment.

20 Claims, 8 Drawing Sheets

(56) References Cited

U.S. PATENT DOCUMENTS

| | | | | |
|---|---|---|---|---|
| 2008/0244693 | A1* | 10/2008 | Chang | H04L 67/02 726/1 |
| 2012/0110667 | A1* | 5/2012 | Zubrilin | G06F 21/56 726/24 |
| 2013/0091539 | A1* | 4/2013 | Khurana | H04L 63/1425 726/1 |
| 2014/0096113 | A1* | 4/2014 | Kuehlmann | G06F 11/3672 717/126 |
| 2015/0293837 | A1* | 10/2015 | Rajamanickam | G06F 11/3676 717/124 |
| 2016/0149930 | A1* | 5/2016 | Casaburi | H04L 63/1425 726/1 |

* cited by examiner

AUTO-TUNING PERMISSIONS USING A LEARNING MODE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Distributed systems may place a high importance on security of user access to system resources using appropriate permissions. Resource owners and resource administrators often use such access control policies to control access by users to computing resources in order to support the requirements of resource owners, administrators, and users. Defining and maintaining user roles, permissions, or policies can grow increasingly complex, particularly as the size and/or complexity of the system or the number of computer system users increases.

Figure 1A:
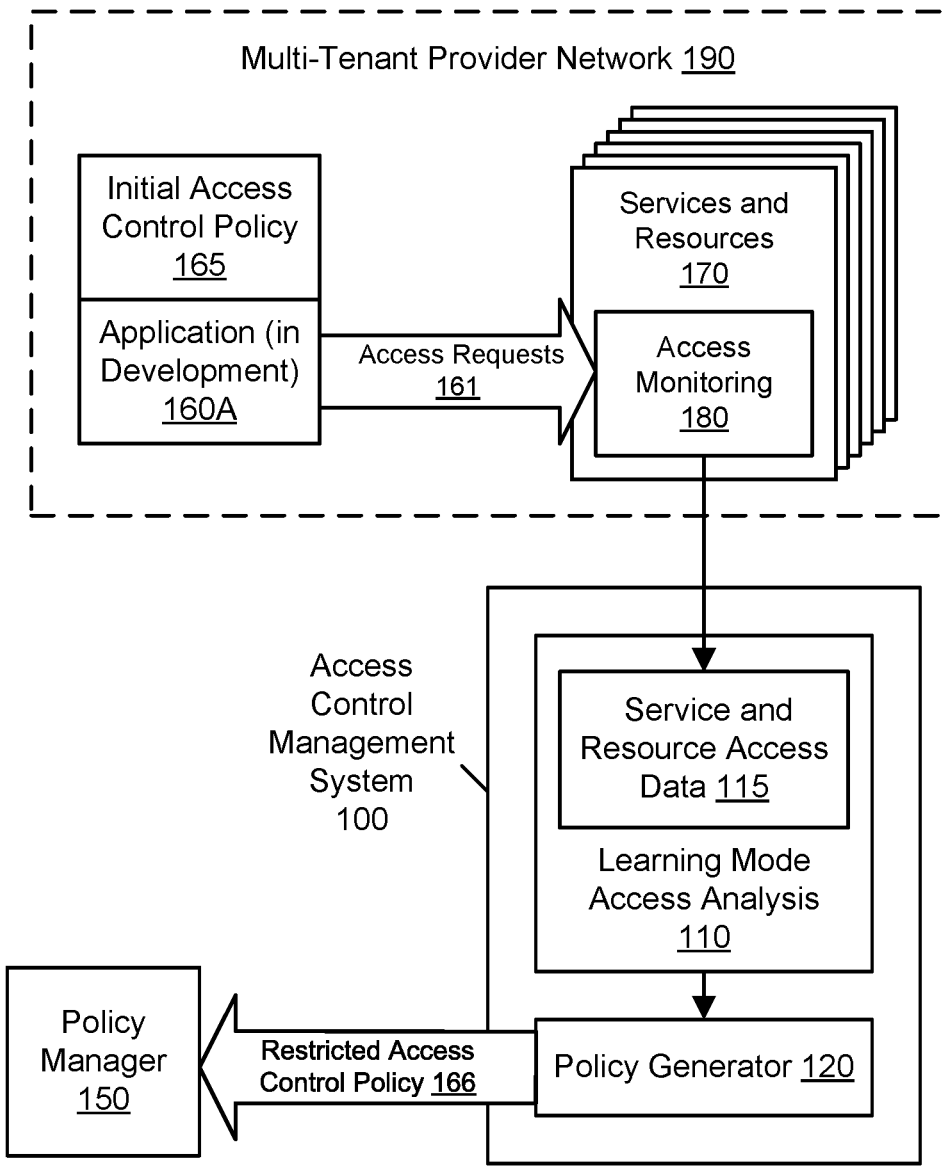
FIG. 1A and FIG. 1B illustrates an example system environment for auto-tuning permissions using a learning mode, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for auto-tuning permissions using a learning mode are described. Using prior approaches for access control policy management, access control policies were manually written by developers of applications or security experts, typically early in the application's lifecycle. Such manual techniques could be time-consuming, particularly if requests for policies were submitted to external teams that were not immediately available to perform the requested tasks. Additionally, such manual techniques may be prone to error, e.g., by granting insufficient access and thus hindering the performance of the application or by granting overly broad access and thus posing a security risk. Manually written policies may also become outdated as the needs of the application change or as available services and resources change.

Using the techniques described herein for auto-tuning application permissions, software products such as applications may be monitored to determine actual requests to services and resources, the request data may be analyzed, and appropriate access control policies may be generated based (at least in part) on the analysis such that applications are granted access only to those services and resources that they actually use. Permissions for users or user groups may be auto-tuned using similar techniques. Auto-tuning permissions may generate new policies using a learning mode of limited duration, e.g., for applications in development. Developers may freely experiment with service dependencies and configurations during the development process by using a broad or unrestricted access policy to services and resources. Auto-tuning permissions may also restrict existing policies using a continuous auto-tuning mode of indefinite duration, e.g., for applications in production. By auto-tuning permissions, developers and policy managers need not manually write access control policies. Policies may be scoped appropriately for the actual needs of applications or users, and application development need not be delayed while waiting for external teams to write or update policies.

As one skilled in the art will appreciate in light of this disclosure, embodiments may be capable of achieving certain technical advantages, including some or all of the following: (1) improving the security of a distributed system by automatically generating new access control policies that are appropriately scoped for the needs of particular applications or users based on monitoring of actual requests during a learning mode; (2) improving the security of a distributed system by automatically restricting existing access control policies based on monitoring of actual requests during a continuous auto-tuning mode; (3) improving the speed of application development using automatic generation of access control policies that are used by developers to test applications; (4) improving resource usage in a distributed system by automatically determining resource access patterns and notifying users of abnormalities; (5) improving resource usage in a distributed system by automatically determining resources that are unused or insufficiently used and recommending that such resources be deprovisioned or deleted; and so on.

FIG. 1A illustrates an example system environment for auto-tuning application permissions using a learning mode, according to some embodiments. Various embodiments of an access control management system 100 may generate access control policies that control access to various services and resources 170. In one embodiment, the system 100 may use automated techniques to evaluate the data generated by the monitoring of software products and generate appropriate access control policies based on the evaluation. Software products may include executable program code such as applications, services, components of applications, components of services, and so on. The terms "application" and "service" may be used interchangeably herein. Application 160A represents an example of a software product. Application 160A may be written and executed by an individual developer or team of developers. Application 160A may represent a software product that is under development or in pre-production, e.g., such that the application is not configured to interact with users outside of a development team. The application 160A may be deployed to a pre-production or development environment that is isolated from real-world traffic (e.g., requests or other input from clients). The pre-production or development environment may include historical or synthetic traffic so that the application 160A can be tested.

Services and resources 170 accessible via access control policies may include compute instances, storage resources, database resources, and so on. Services may include software products that perform various tasks in response to requests from clients, including other services. In some embodiments, services may offer access to resources. For example, a multi-tenant provider network 190 may offer a virtual computing service that provisions compute instances from pools of available resources and then permits clients to operate those instances. As another example, the multi-tenant provider network 190 may offer a cloud-based storage service that reserves storage resources from pools of available resources and then permits clients to read from and write to those storage resources. Services may perform actions that can be requested or invoked by clients of those services. Services may offer application programming interfaces (APIs) by which the resources can be accessed or the actions requested.

In one embodiment, a policy manager 150 may manage access control policies that dictate which users can access which services and resources 170 and the circumstances under which those users can access the services and resources. Access control policies may include or determine permissions or privileges with respect to particular services and resources 170. An owner of a service or resource may grant a user (or user group) access to the service or resource in order for the user to perform one or more actions while ensuring the security of the service or resource. In order to manage user privileges, a service or resource owner may delegate authority to access a given service or resource in a multiplicity of different ways to allow varying levels of access to the resource according to resource access policies. A principal (or set of principals) that are authorized by the delegation of authority to access the given service or resource may be referred to herein as "authorized delegates."

To perform auto-tuning of application permissions for the application 160A in development, the system 100 may initiate a learning mode for the application. In one embodiment, the learning mode may be initiated based (at least in part) on user input from a developer of the application 160A. The user input may indicate a starting time, ending time, and/or fixed duration for the learning mode. The fixed duration may be selected by a user from a set of predetermined durations (e.g., one week, thirty days, sixty days, etc.) or may otherwise be specified by a user. In one embodiment, the learning mode may be initiated automatically by the system if particular conditions are met. In one embodiment, for example, the learning mode may be initiated automatically for applications having particular tags or other metadata.

During the learning mode, actual access requests 161 from the application 160A may be monitored. In one embodiment, services and resources 170 may include components for access monitoring 180. For example, each service instance may include agent software that performs the access monitoring 180. Using the access monitoring 180, services and resources 170 may create a record of each access request or a suitable sample of access requests. For example, if the application 160A has issued a request to read from a particular database table, then the request data for that access may indicate the accessed resource, the date and time of the request, whether the request was successful or unsuccessful, and so on. In one embodiment, the system 100 may acquire request data, also known as service and resource access data 115, from the access monitoring component(s) 180. In one embodiment, the system 100 may acquire request data 115 from an external service that monitors usage of services and resources 170. In some embodiments, the system 100 may acquire request data 115 from two or more types of request data providers (e.g., services themselves as well as an external monitoring service) and combine all the data for a more thorough analysis of access patterns. The request data 115 may be written to a particular storage resource (e.g., a particular "bucket" in a cloud-based storage service) and then read from that resource by the system 100.

During the learning mode, the application 160A may use an initial access control policy 165 that enables broad access to the services and resources 170. For example, if the services and resources 170 include a particular table, then the initial policy 165 may permit the application 160A to read from and write to that table. As another example, if the services and resources 170 include a particular service, then the initial policy 165 may permit the application 160A to send an unlimited number of requests to that service or otherwise not place limitations on the timing and content of requests. The initial policy 165 may represent a blank slate of permissions. The same initial policy 165 may be used across many applications and may not be tailored for particular applications. The initial policy 165 may also be referred to as an unrestricted access control policy. In one embodiment, the initial access control policy 165 may be automatically generated by the system 100 and not necessarily based on input from developers of the application 160A. In one embodiment, the initial access control policy 165 may permit the application 160A to access versions of the services and resources 170 implemented in a pre-production or development environment but not necessarily versions of those services and resources in a production environment. The initial policy 165 may be attached to a role managed by the policy manager 150 or another identity and access management service. The role may be associated with one or more users or user groups that execute the application 160A. The role may be used by the application 160A during the learning mode.

The system 100 may acquire the request data, also known as service and resource access data 115, during the learning mode or after the end of the learning mode. The system 100 may perform access analysis 110 for the application's learning mode using the data 115. The access analysis 110 may include aggregation, deduplication, and/or summarization of the data 115 for the application 160A. The request data 115 may be aggregated and/or deduplicated by the system 100 itself or may be aggregated and/or deduplicated by the request data providers before being provided to the system 100. For example, if the application 160A has issued a series of requests to read from a particular database table at different times, then the aggregated and/or deduplicated request data may represent those accesses using a single entry that indicates the accessed resource, the number of accesses over the fixed duration of the learning mode, the success rate of the requests, the date and time of the initial request, and date and time of the most recent request, and/or other suitable summarized data.

Using the request data 115, the analysis 110 may determine the services and resources 170 that were actually used by the application during the learning mode, and that analysis may then be used by a policy generator 120 to automatically create an access control policy 166 of appropriately restricted scope. In one embodiment, the analysis 110 may determine whether the number of access requests to a particular service or resource exceeded a threshold or satisfied any other conditions or rules. For example, the analysis 100 may determine that the application 160A used a particular service or resource with a sufficient frequency to justify granting continued access to that service or resource. As another example, the analysis 100 may determine that the application 160A used a particular service or resource so infrequently as not to justify granting continued access to that service or resource. As yet another example, the analysis 100 may determine that the application 160A used a particular service or resource at certain times of day and not at other times. The restricted access control policy 166 may include a set of permissions or privileges to allow access to only a portion of the services and resources 170 or with other access restrictions (e.g., with access permitted only at certain times of day or otherwise under particular circumstances). The restricted policy 166 may reflect the actual, observed access patterns of the application 160A over the course of the learning mode.

The restricted policy 166 may be provided to the policy manager 150. The restricted policy 166 may be attached to a particular role managed by the policy manager 150 or another identity and access management service. The role may be associated with one or more users or user groups that execute the application 160A. The role offering restricted access according to the policy 166 may be used by the application 160A during continued execution beyond the learning mode. In one embodiment, the restricted policy 166 may be automatically attached to the role associated with the developers or other team that owns the application 160A. In one embodiment, the restricted policy 166 may be attached to the role based (at least in part) on user input. For example, a description of the restricted policy 166 may be provided to a user associated with the application 160A, and user input may be solicited to approve or deny the auto-generated policy for the application. However, the user need not manually write the policy 166.

Figure 1B:
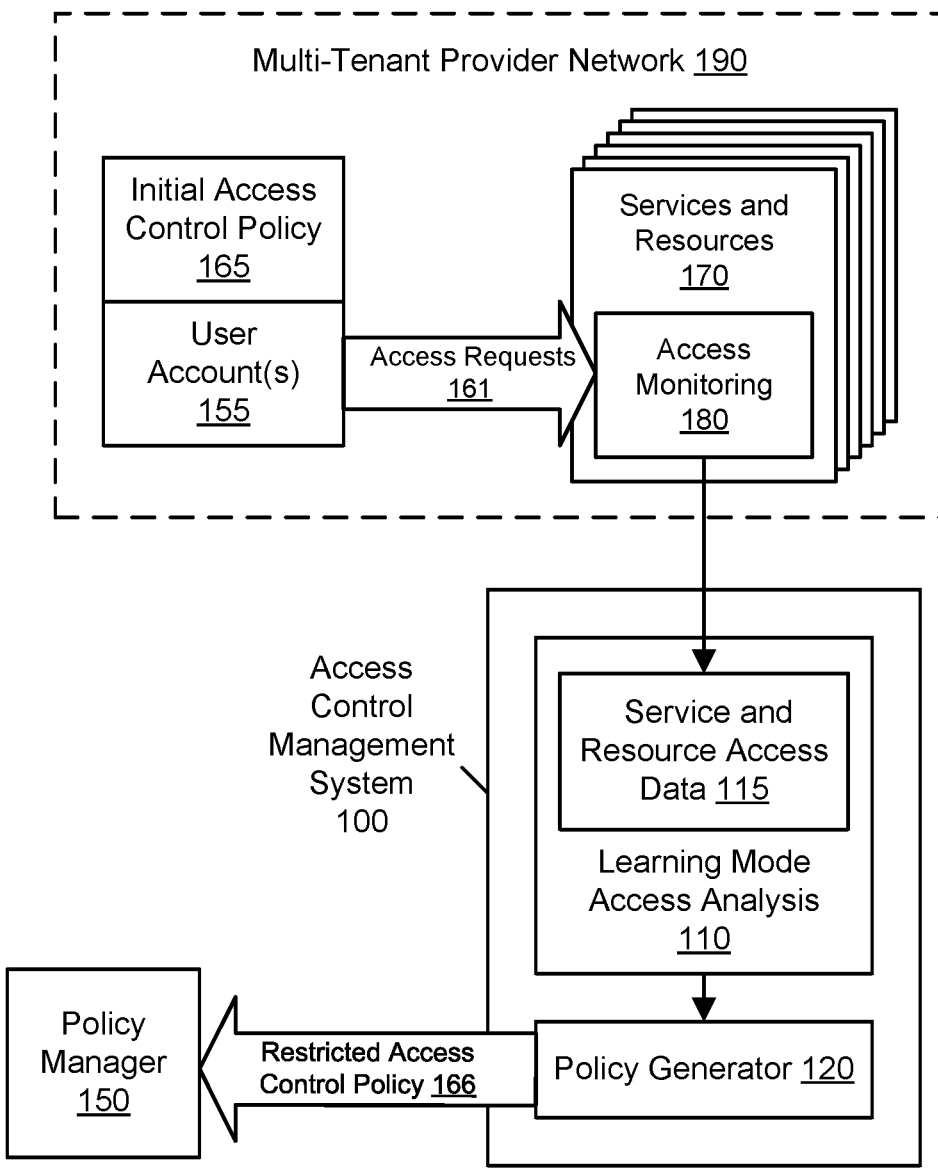

In one embodiment, as shown in FIG. 1B, the learning mode may be used for a developer or developer team and not necessarily for a specific application. The request data 115 may be captured for any applications or other software products associated with the particular user account(s) 155 for which learning mode has been enabled. The request data 115 may be captured for any interfaces used by the particular user account(s) 155 for which learning mode has been enabled. For example, user requests 161 entered via a graphical user interface (GUI), command-line interface (CLI), voice-enabled interface, and/or application programming interface (API) may be monitored. The access analysis 110 may determine actual access patterns across one or more software products or interfaces by the particular user(s) 155. The policy generator 120 may then generate a restricted access control policy 166 for the one or more user accounts (or user group) 155, and that policy may be attached to a particular role that is used by the user(s) or group.

Figure 7:
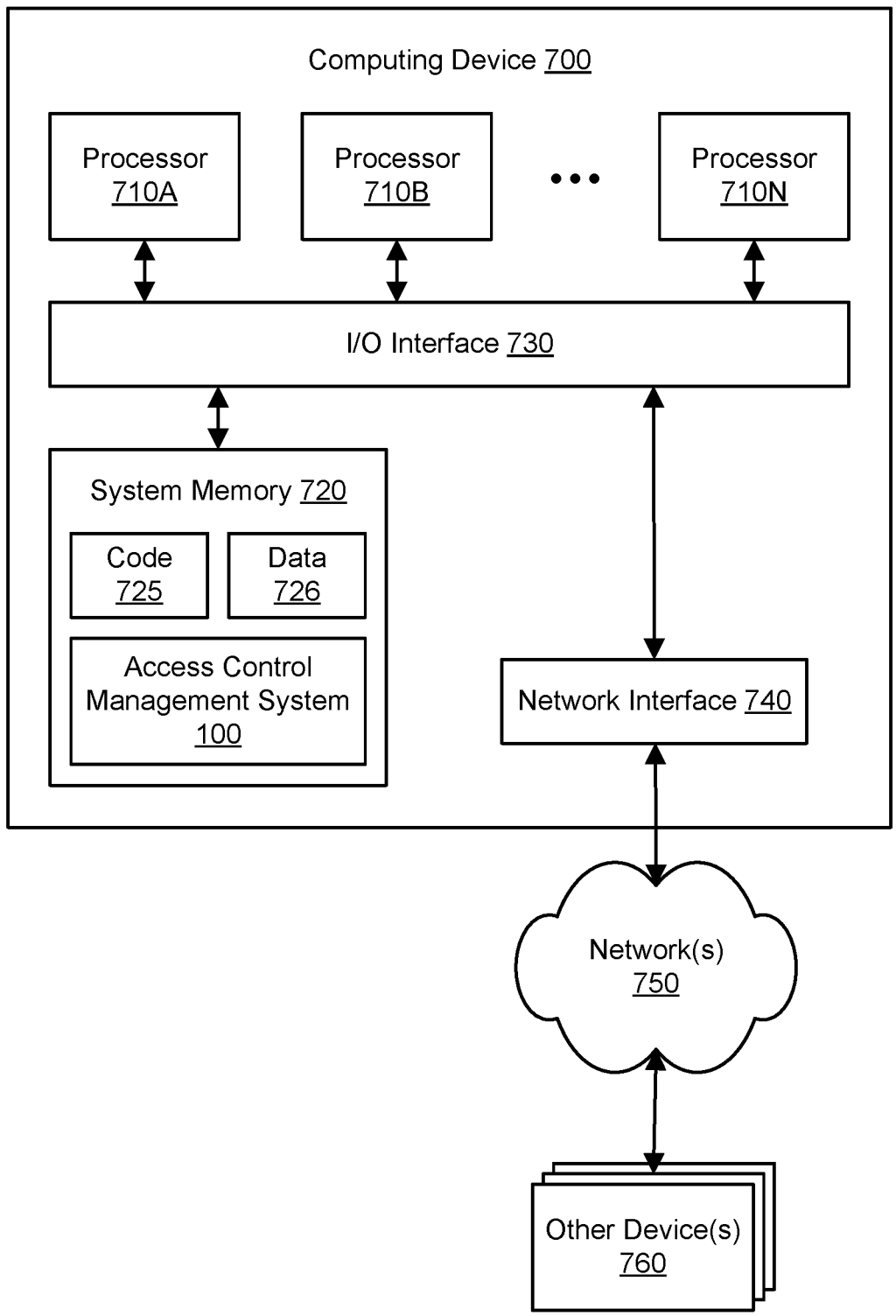
FIG. 7 illustrates an example computing device that may be used in some embodiments.

The access control management system 100, application 160A, policy manager 150, and services and resources 170 may be implemented using any suitable number and configuration of computing devices, any of which may be implemented by the example computing device 700 illustrated in FIG. 7. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the access control management system 100, application 160A, policy manager 150, and services and resources 170 may include additional components not shown, fewer components than shown, or different combinations, configurations, or quantities of the components shown.

The access control management system 100, application 160A, policy manager 150, and services and resources 170 may be implemented in a service-oriented system in which multiple services collaborate to perform complex tasks according to a service-oriented architecture. In such an environment, the system 100 may offer its functionality as service to multiple clients. A service (such as one of the services 170) may be implemented using a plurality of different instances that are distributed throughout one or more networks, and each instance may offer access to the functionality of the corresponding service to various clients. It is contemplated that any suitable number and configuration of clients may interact with the system 100. To enable clients to invoke its functionality, the system 100 may expose any suitable interface(s), such as one or more APIs or other programmatic interfaces and/or graphical user interfaces (GUIs). In one embodiment, the functionality of the system 100 may be offered to clients in exchange for fees.

Components shown in FIG. 1A and FIG. 1B may convey network-based service requests and other data to each other via one or more networks. In various embodiments, the network(s) may encompass any suitable combination of networking hardware and protocols necessary to establish network-based communications, e.g., between the provider network 190 and the system 100. For example, the network(s) may generally encompass the various telecommunications networks and service providers that collectively implement the Internet. The network(s) may also include private networks such as local area networks (LANs) or wide area networks (WANs) as well as public or private wireless networks. In some embodiments, any of the components shown in FIG. 1A and FIG. 1B may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between one component and the Internet as well as between the Internet and another component. It is noted that in some embodiments, components may communicate using a private network rather than the public Internet.

In one embodiment, the services and resources 170 may be implemented using resources of the provider network 190. In some embodiments, aspects of the access control management system 100, application 160A, and/or policy manager 150 may also be implemented using resources of the provider network 190. The provider network 190 may represent a network set up by an entity such as a business entity or a public-sector organization to provide one or more services (such as various types of network-accessible computing or storage) accessible via the Internet and/or other networks to a distributed set of clients. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network.

In some embodiments, an operator of the provider network 190 may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on.

Figure 2:
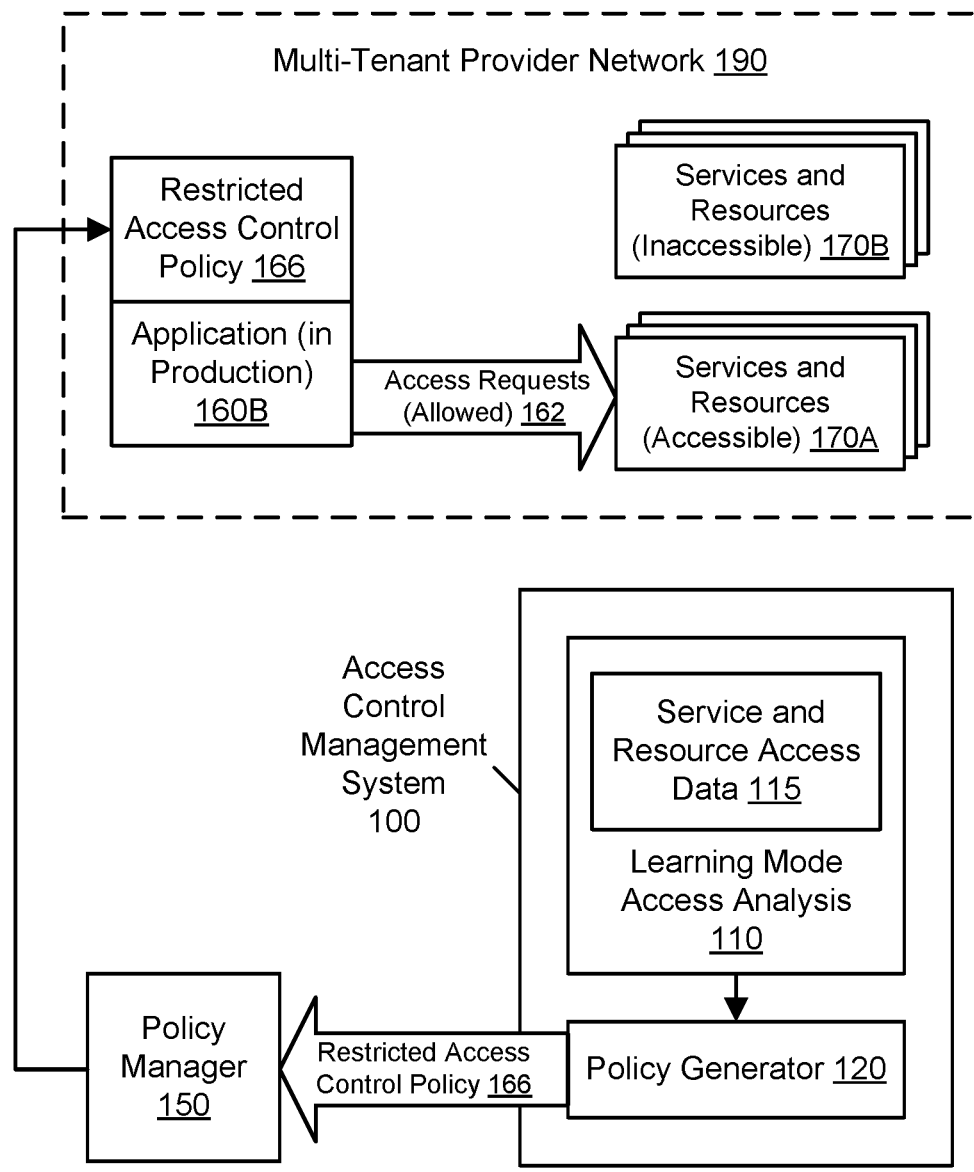
FIG. 2 illustrates further aspects of the example system environment for auto-tuning permissions using a learning mode, including deployment of an application into production with a restricted access control policy determined using the learning mode, according to some embodiments.

FIG. 2 illustrates further aspects of the example system environment for auto-tuning permissions using a learning mode, including deployment of an application into production with a restricted access control policy determined using the learning mode, according to some embodiments. As discussed above, a restricted access control policy 166 may be automatically generated based (at least in part) on evaluation of request data 115 generated during a learning mode. The restricted policy 166 may be attached to a role, and the application may be executed using that role. For example, as shown in FIG. 2, a version of the application 160B may be deployed into production using the restricted access control policy 166. The application 160B may be deployed in a production environment that is not isolated from real-world traffic. The production environment may include or be associated with versions of the services and resources 170 that interact with real-world clients. The services and resources 170 may include one set 170A (including one or more services and/or resources) and another set 170B (including one or more services and/or resources), and the restricted policy 166 may permit access to the one set of services and resources 170A but not to the other set of services and resources 170B. Accordingly, using the restricted policy 166, the application 160B may issue requests 162 to the accessible services and resources 170A. However, the policy 166 may prevent the application 160B from issuing requests to the inaccessible services and resources 170B. Thus, as shown in the example of FIG. 2, the restricted access control policy 166 auto-generated from the learning mode may be used to restrict the access of the application 160B to particular services and resources. Similarly, a user or user group may be granted access to the services and resources 170A but not the services and resources 170B via a role to which the restricted policy 166 is attached.

Figure 3:
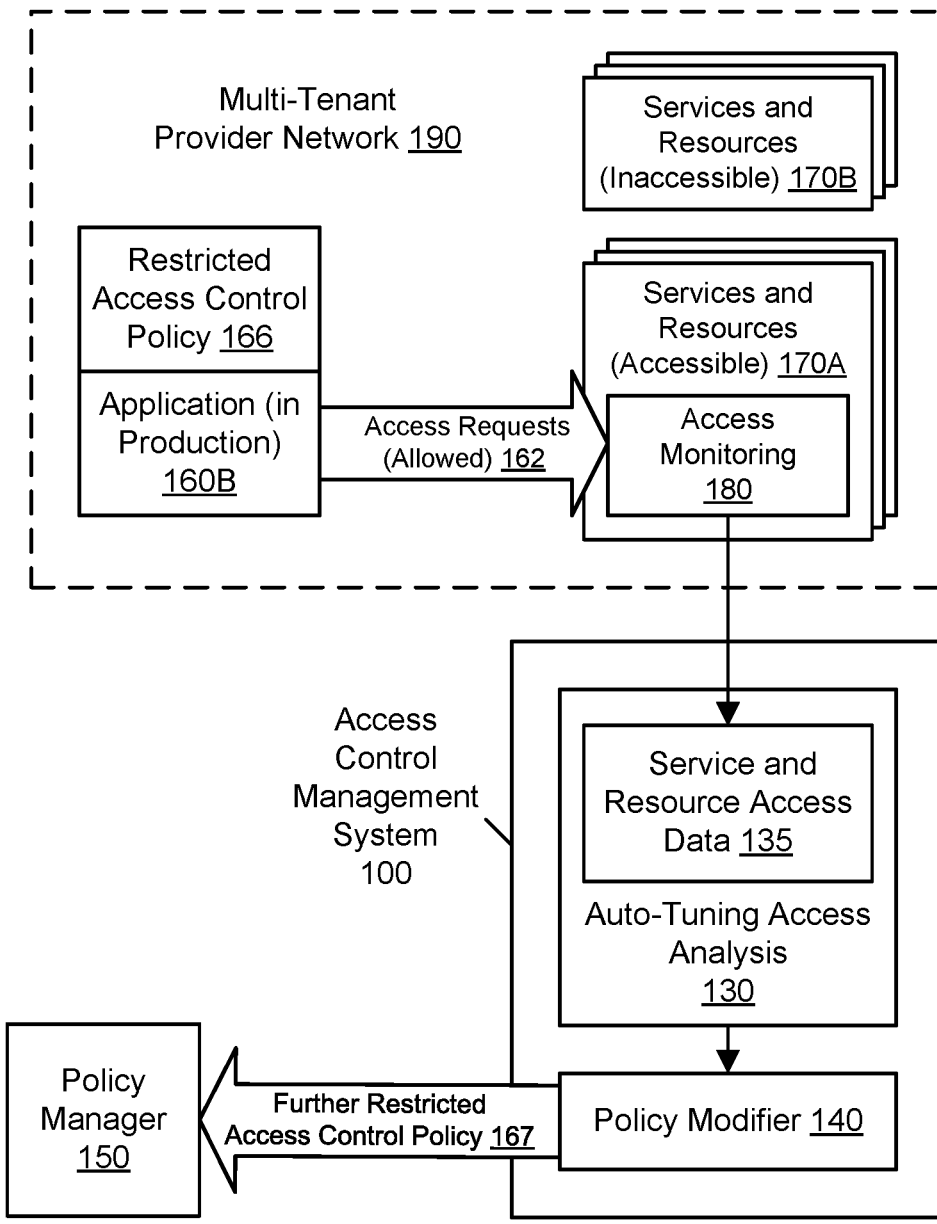
FIG. 3 illustrates further aspects of the example system environment for auto-tuning permissions using a learning mode, including further auto-tuning an application's permissions while the application is in production, according to some embodiments.

FIG. 3 illustrates further aspects of the example system environment for auto-tuning permissions using a learning mode, including further auto-tuning an application's permissions while the application is in production, according to some embodiments. As discussed above, auto-tuning application permissions may generate new policies using a learning mode of limited duration, e.g., for applications in development. As shown in FIG. 3, auto-tuning application permissions may also modify existing policies using a continuous auto-tuning mode of indefinite duration, e.g., for applications in production. In one embodiment, the continuous auto-tuning mode may be used to further restrict (or "scope down") an access control policy, e.g., by removing permissions or placing additional restrictions on permissions. In one embodiment, to expand (or "scope up") an access control policy, the application may be placed back into learning mode for execution using a broad or unrestricted access control policy. The learning mode may be used any suitable number of times for a particular application in order to automatically adapt the application's access needs to changes in the application or changes in the environment (e.g., the services and resources 170).

To perform auto-tuning of application permissions for the application 160B in production, the system 100 may initiate the continuous auto-tuning mode for the application. In one embodiment, the continuous auto-tuning mode may be initiated based (at least in part) on user input from a developer of the application 160B. The user input may indicate that the continuous auto-tuning mode should be run according to a schedule (e.g., according to a user-specified starting time, ending time, and/or fixed duration), or should instead be run continuously and for an indefinite duration, or at least until stopped by the user. In one embodiment, the continuous auto-tuning mode may be initiated automatically by the system if particular conditions are met. In one embodiment, the continuous auto-tuning mode may be initiated automatically for applications having particular tags or other metadata.

During the continuous auto-tuning mode, actual access requests 162 from the application 160B may be monitored. In one embodiment, accessible services and resources 170A may include components for access monitoring 180. For example, each service instance may include agent software that performs the access monitoring 180. Using the access monitoring 180, accessible services and resources 170A may create a record of each access request or a suitable sample of access requests. For example, if the application 160B has issued a request to read from a particular database table, then the request data for that access may indicate the accessed resource, the date and time of the request, whether the request was approved or denied, and so on. In one embodiment, the system 100 may acquire request data, also known as service and resource access data 135, from the access monitoring component(s) 180. In one embodiment, the system 100 may acquire request data 135 from an external service that monitors usage of services and resources 170A. In some embodiments, the system 100 may acquire request data 135 from two or more types of request data providers (e.g., services themselves as well as an external monitoring service) and combine all the data for a more thorough analysis of access patterns. The request data 135 may be written to a particular storage resource (e.g., a particular "bucket" in a cloud-based storage service) and then read from that resource by the system 100.

During the continuous auto-tuning mode, the application 160B may use the restricted access control policy 166 that permits access to only the services and resources 170A and not to the services and resources 170B. The policy 166 may be attached to a role managed by the policy manager 150 or another identity and access management service. The role may be associated with one or more users or user groups that execute the application 160B. The role may be used by the application 160B during the continuous auto-tuning mode.

The system 100 may acquire the request data 135 during the continuous auto-tuning mode. The system 100 may perform access analysis 113 for the application's continuous auto-tuning mode using the data 135. The access analysis 130 may include aggregation, deduplication, and/or summarization of the data 135 for the application 160B. The request data 135 may be aggregated and/or deduplicated by the system 100 itself or may be aggregated and/or deduplicated by the request data providers before being provided to the system 100. For example, if the application 160B has issued a series of requests to read from a particular database table at different times, then the aggregated and/or deduplicated request data may represent those accesses using a single entry that indicates the accessed resource, the number of accesses over the fixed duration of the learning mode, the success rate of the requests, the date and time of the initial request, and date and time of the most recent request, and/or other suitable summarized data.

Using the request data 135, the analysis 130 may determine which of the services and resources 170A were actually used by the application 160B during the continuous auto-tuning mode, and that analysis may then be used by a policy modifier 140 to automatically alter the access control policy 166. In one embodiment, the policy modifier 140 may remove permissions from the policy 166 or place additional restrictions on permissions in the policy 166. The policy modifier 140 may output a further restricted access control policy 167 that reflects the further restricted scope. In one embodiment, the analysis 130 may determine whether the number of access requests to a particular service or resource exceeded a threshold or satisfied any other conditions or rules. For example, the analysis 100 may determine that the application 160B used a particular service or resource with a sufficient frequency to justify granting continued access to that service or resource. As another example, the analysis 100 may determine that the application 160B used a particular service or resource so infrequently to justify granting continued access to that service or resource. As yet another example, the analysis 100 may determine that the application 160B used a particular service or resource at certain times of day and not at other times. The further restricted access control policy 167 may include a set of permissions or privileges to allow access to only a portion of the services and resources 170A or with other access restrictions (e.g., with access permitted only at certain times of day). The further restricted policy 167 may reflect the actual, observed access patterns of the application 160B over the course of the continuous auto-tuning mode.

In one embodiment, the further restricted policy 167 may be generated subject to one or more rules, e.g., such that particular access privileges are never removed. For example, the provider network 190 may include a service that enables governance, compliance, operational auditing, and risk auditing of a provider network account, and access privileges to provide data to that service may not be removed from the updated policy 167. In one embodiment, the further restricted policy 167 may be generated based (at least in part) on access patterns of similar users and accounts.

The further restricted policy 167 may be provided to the policy manager 150. The further restricted policy 167 may be attached to a particular role managed by the policy manager 150 or another identity and access management service. The role may be associated with one or more users or user groups that execute the application 160B. The role offering the further restricted access may be used by the application 160B during continued execution, e.g., during or beyond the continuous auto-tuning mode. The system 100 may further restrict the access control policy for an application 160B repeatedly throughout the continuous auto-tuning mode. In one embodiment, the further restricted policy 167 may be automatically attached to the role associated with the developers or other team that owns the application 160B. In one embodiment, the further restricted policy 167 may be attached to the role based (at least in part) on user input. For example, a description of the further restricted policy 167 may be provided to a user associated with the application 160B, and user input may be solicited to approve or deny the auto-tuned policy for the application. However, the user need not manually write or modify the policy 167.

In one embodiment, the continuous auto-tuning mode may be used for a user(s) or user group 155 and not necessarily for a specific application. The request data 135 may be captured for any software products or interfaces used by the particular user(s) 155 for which the continuous auto-tuning mode has been enabled. In one embodiment, the continuous auto-tuning mode may be automatically enabled for any software products having particular tags or other metadata, e.g., that associate the software products with the particular user(s) 155. The access analysis 130 may determine actual access patterns across one or more software products and/or interfaces by the particular user(s) 155. The policy modifier 140 may then generate a further restricted access control policy 167 for the user(s) or user group 155, and that policy may be attached to a role used by the user(s) or group.

Figure 4:
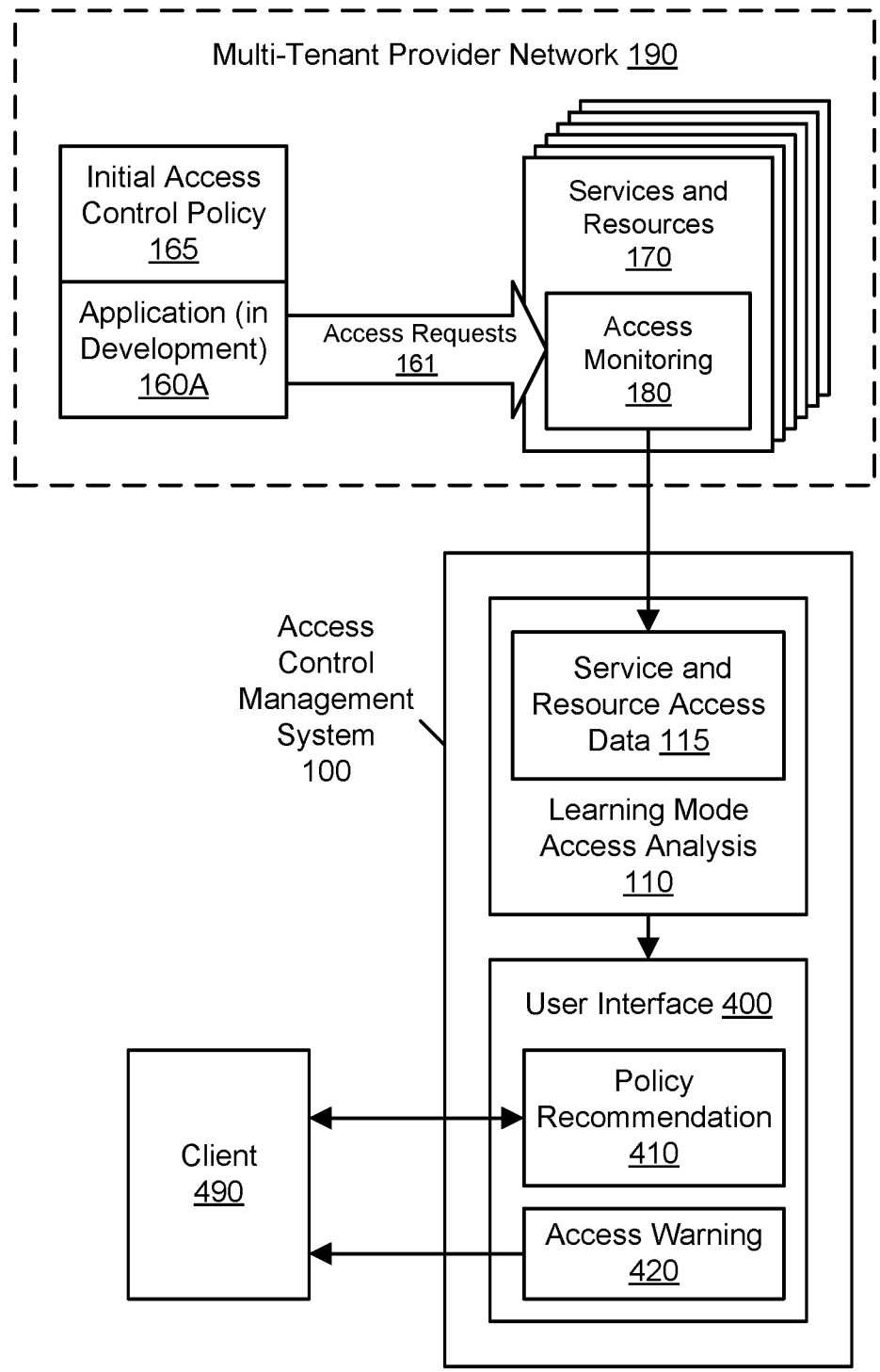
FIG. 4 illustrates further aspects of the example system environment for auto-tuning permissions using a learning mode, including a user interface offered by the access control management system, according to some embodiments.

FIG. 4 illustrates further aspects of the example system environment for auto-tuning permissions using a learning mode, including a user interface offered by the access control management system, according to some embodiments. The access control management system 100 may include a user interface 400 that allows the system to interact with one or more clients. For example, a client 490 may represent a developer or other user associated with the application 160A or 160B. The user interface 400 may include a graphical user interface (GUI), a command-line interface (CLI), an application programming interface (API), and/or other suitable channels for providing information to clients and receiving input from clients.

In some embodiments, using a component 410 for policy recommendation, an auto-generated access control policy 166 or auto-tuned access control policy 167 may be attached to a role used by the application 160A or 160B based (at least in part) on input obtained using the user interface 400 from the client 490. For example, a description of the restricted policy 166 may be provided to a user 490 associated with the application 160A, and user input may be solicited to approve or deny the recommended policy for the application. In some embodiments, using a component 420 for access warning, the system 100 may inform the client 490 of abnormal access patterns or other usage concerns. For example, if the system 100 determines that the frequency of accessing a particular resource has increased significantly, then the system may notify the client 490 of the abnormality. As another example, if the system 100 determines that the application 160B is not accessing a particular storage resource for which it has access privileges, then the system may notify the client 490 of the unused resource and recommend that the resource be deprovisioned or deleted so that the client may minimize resource usage and cost.

Figure 5:
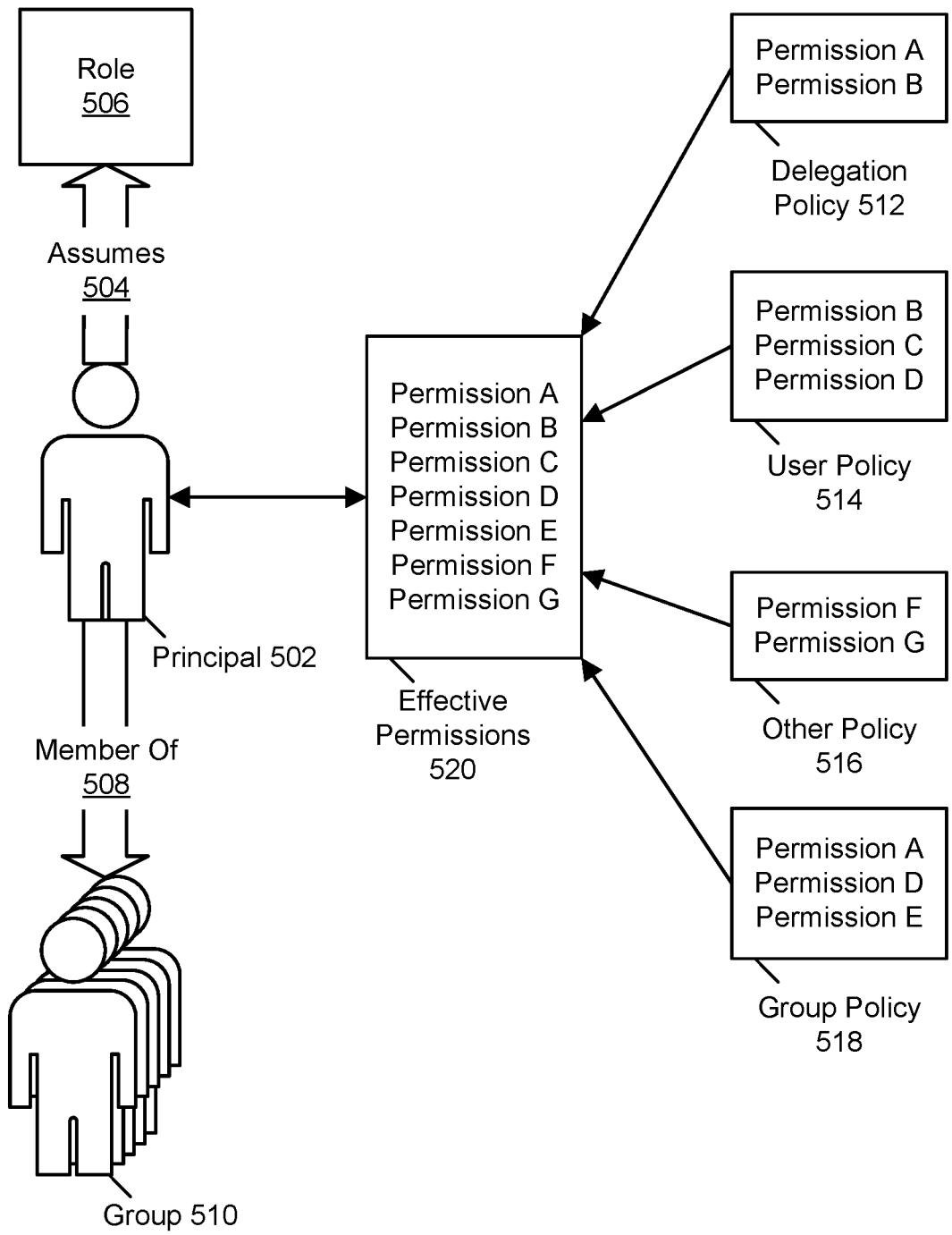
FIG. 5 illustrates an example of a permissions scheme in which permissions associated with access control policies are consolidated, according to some embodiments.

FIG. 5 illustrates an example of a permissions scheme in which permissions associated with access control policies are consolidated, according to some embodiments. A principal 502 may have a set of effective permissions 520 that may be an aggregate of the permissions granted by one or more policies associated with that principal's access to resources. The set of effective permissions 520 may specify a plurality of permissions which detail resources the principal 502 may access, which resources the principal 502 may not access, and under which conditions access to those resources may be allowed (or granted) or denied. For example, a set of effective permissions 520 may include one or more permissions that are associated with the principal, and one or more permissions that come from a different source such as, for example, a group policy, a delegation policy, roles assumed by the principal, organizational policies, or default policies. With respect to a policy, the policy's effective permissions may be those permissions that the policy explicitly or implicitly defines. For instance, a policy may explicitly grant a principal a set of permissions to perform a set of actions in connection with a resource. As another example, a policy may implicitly grant permissions to principals by granting permissions to a group (of which the principals are a member). The effective permissions of a policy may change over time. For example, a policy may be a role policy and principals able to assume the role may change over time despite the policy remaining static. As a result, effective permissions may change as the principals authorized to assume the role change. In other words, an effective permission is an access right of a principal to perform an action on a resource. A policy may grant effective permissions explicitly (e.g., by specifying the principal, the action, and the resource) and/or implicitly (e.g., by specifying the permissions in a way that leaves one or more of the principal, action, or resource unspecified explicitly).

In one embodiment, when a default policy is to deny access to resources, the permissions may specify which resources are allowed. In one embodiment, when the default policy is to allow access to resources, the permissions may specify access to the resources which are not explicitly denied. In one embodiment, with some other default policy, the permissions may specify a combination of allowed and denied resource access. In some embodiments, the set of effective permissions 520 may be an aggregation of permissions for a particular resource and/or class of resources. In some embodiments, the set of effective permissions 520 may be an aggregation of permissions for multiple resources (e.g., an aggregation of permissions associated with all resources managed by a service for the user, an aggregation of permissions associated with a user account, or some other aggregation of permissions).

The set of effective permissions 520 may specify a combination or aggregation of permissions based on aspects of the principal. For example, if the principal 502 is a user, then the set of effective permissions 520 may specify one or more user policy permissions 514. User policy permissions 514 may include permissions related to the type of the principal 502 (i.e., a "user," a "group," or an "organization") and may also include permissions associated with a specific set of credentials associated with the identity of the principal 502.

In addition to permissions related to the class and/or the identity of the principal 502, the set of effective permissions 520 may specify one or more delegation policy permissions 512 as a result of the principal 502 assuming 504 one or more roles 506 specified within an organization. As an example, a principal 502 may be a software developer and may assume 504 a software developer role in his or her day-to-day activities and may become an authorized delegate for the set of permissions associated with assuming the software developer role. A software developer role may specify a set of delegation policy permissions 512 that are included in the set of effective permissions 520 associated with the principal 502. There may be some overlap in the user policy permissions 514 and the delegation policy permissions 512 (e.g., "Permission B"). There may also be conflicts between the user policy permissions 514 and the delegation policy permissions 512. For example, "Permission A" in delegation policy permissions 512 may grant access to a resource at all times, while "Permission C" in user policy permissions 514 may deny such access. In the event of such conflicts, a default policy and/or a default policy conflict resolution standard may prevail (i.e., to prefer denial or to prefer granting).

Similarly, the set of effective permissions 520 may specify one or more group policy permissions 518 as a result of a principal 502 being a member of 508 one or more groups 510 (e.g., a production group). The set of effective permissions 520 may also specify one or more other policy permissions 516 such as those associated with default policies, organizational policies, policies associated with certain applications, policies associated with heightened security conditions, temporary polices, or other such policies.

A principal 502 may also assume multiple roles and thus multiple sets of role policy permissions. For example, the principal 502 that assumes a software developer role in his or her day-to-day activities may, at some point during his or her day, need more permissions such as those which may be associated with a system administrator role. In such an example, the principal may temporarily assume a system administrator role, perform one or more privileged operations granted by that role, and then may release that role, thereby returning his or her policy to the less privileged set of permissions. As may be contemplated, the types of roles and the associated permissions described in association with those roles are illustrative examples and other types of roles and associated positions may be considered as within the scope of the present disclosure.

Permissions associated with the set of effective permissions 520 may be altered for the principal 502 by adding and/or removing permissions (e.g., as a result of API calls to a policy management service) from the delegation policy permissions 512, from the user policy permissions 514, from the group policy permissions 518, from the other policy permissions 516, or from other such groups of permissions. For example, removing "Permission E" from the set of effective permissions 520 may be accomplished by removing that permission from the group policy permissions 518. Such a removal may also remove that permission from any other principals who are members of that group which may or may not be a desirable effect. Redundant permissions may be removed from a policy. For example, users with user policy permissions 514 and with delegation policy permissions 512 have "Permission B" granted by both policies and as such, "Permission B" may be removed from either delegation policy permissions 512 or user policy permissions 514 without altering the permissions in the set of effective permissions 520. In both of these examples, other policy modification actions may also accomplish the same result (e.g., altering group membership and/or role assignments as described herein).

For example, the principal may be removed from the group (rather than altering the permissions of the group) and, because in the example illustrated in FIG. 5, "Permission A" and "Permission D" are granted by other policy permissions, the result would be to remove "Permission E" from the principal without altering the permissions of other principals. Similarly, permissions for a principal may be altered by adding the principal to a new group with different permissions (i.e., a newly created and/or previously specified group), assuming and/or releasing roles from the principal, altering roles, splitting groups based on the principals and/or the desired permissions, or other such actions. For example, a group may have ten members and may grant five permissions. Five of the group members may be suited to having the first four permissions and five of the group members may be suited to having the last three permissions. Splitting this group into two groups, each of which has the appropriate permissions and then making the appropriate principals members of the appropriate groups may make the permissions more optimal for each of the members.

In an embodiment, a permission may specify a principal 502, a resource, an action, a condition, and/or an effect. In some embodiments, a permission may specify a plurality of one or more of these elements such as, for example, a set or class of users, a collection of resources, several different actions, and/or multiple conditions. The principal 502 may represent a user, a group, an organization, a role, or a collection and/or combination of these or other such entities. A principal 502 may be any entity that is capable of submitting API calls that cause an action associated with a resource to be performed and/or any entity to which permissions associated with a resource may be granted. For example, a particular permission may indicate that the principal 502 is a user identified as "USER1." The permission may indicate that an action that may be performed in association with the resource and may, for example, be identified by a type of API call, a library call, a program, process, series of steps, a workflow, or some other such action. For example, an action may be a set of operations that may be performed as part of the fulfillment of an API call to, for example, a web-accessible service. The actions that are performed may be a subset of those actions and/or may be a single operation. The operations may also be performed in a defined order, may be repeated, or may be shared between a plurality of API calls. For example, the action may be an API call to write data to the resource. A permission 402 may further specify a storage resource, a data write API call for the action, a time condition, and an allow effect. Such an example permission may thus specify that "USER1 is ALLOWED to WRITE to 12345 between 9:00 AND 9:30 AM."

Figure 6:
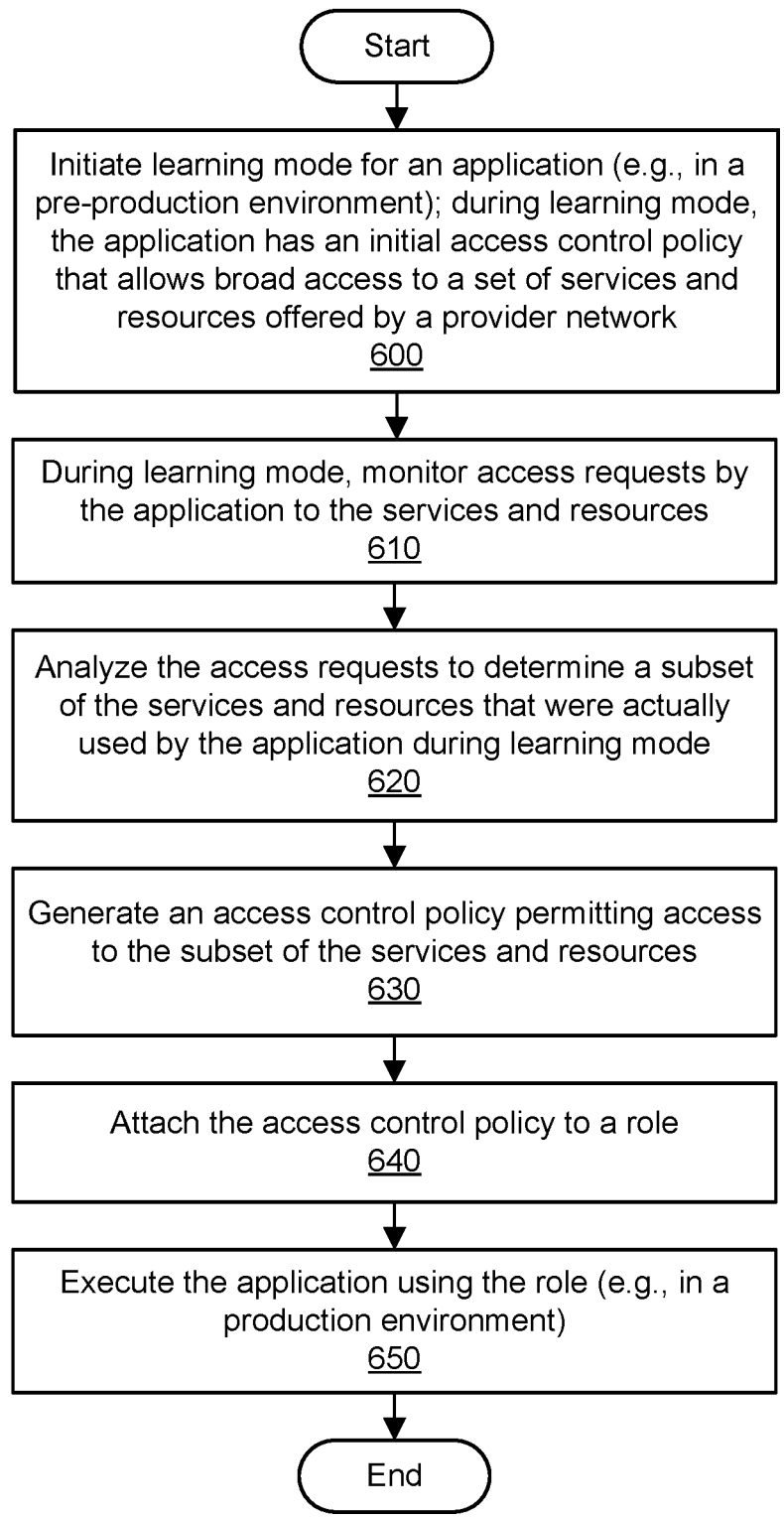
FIG. 6 is a flowchart illustrating a method for auto-tuning application permissions using a learning mode, according to some embodiments.

FIG. 6 is a flowchart illustrating a method for auto-tuning application permissions using a learning mode, according to some embodiments. As shown in 600, learning mode may be initiated for a software product such as an application or for a user or user group. The application may be executed in a pre-production or development environment that is isolated from real-world traffic (e.g., requests or other input from clients). During the learning mode, the application may use an initial and unrestricted access control policy that allows broad access to a set of services and resources offered by a multi-tenant provider network. The initial policy may be attached to a role, the role may be associated with one or more users or user groups that execute the application, and the role may be used by the application during the learning mode. The services and resources may include compute instances, storage resources, database resources, and so on. In some embodiments, services may offer access to resources such as virtualized compute and storage instances and/or actions that users or applications can request. The application may be run in the learning mode (or the user or user group may be monitored) for a fixed and predetermined period of time (e.g., one week, thirty days, sixty days, etc.).

As shown in 610, during the learning mode, access requests by the application or user(s) to the services and resources may be monitored. In one embodiment, the services and resources may include components for access monitoring such as agent software. Services and resources may create a record of each access request or a suitable sample of access requests. For example, if the application or user has issued a request to read from a particular database table, then the request data for that access may indicate the accessed resource, the date and time of the request, whether the request was approved or denied, and so on. In various embodiments, an access control management system may acquire the request data from individual services and resources, from an external service that monitors usage of services and resource, or from a combination thereof. The request data may be written to a particular storage resource (e.g., a particular "bucket" in a cloud-based storage service) and then read from that resource by the access control management system.

As shown in 620, the access requests may be analyzed or evaluated to determine a subset of the services and resources that were actually used by the application or user(s) during the learning mode. The request data may be aggregated and/or deduplicated by the access control management system itself or may be aggregated and/or deduplicated by the request data providers before being provided to the access control management system. Using the request data, the analysis may determine the services and resources that were actually used by the application or user(s) during the learning mode. In one embodiment, the analysis may determine whether the number of access requests to a particular service or resource exceeded a threshold or satisfied any other conditions or rules. For example, the analysis may determine that the application or user(s) used a particular service or resource with a sufficient frequency to justify granting continued access to that service or resource. As another example, the analysis may determine that the application or user(s) used a particular service or resource so infrequently to justify granting continued access to that service or resource. As yet another example, the analysis may determine that the application or user(s) used a particular service or resource at certain times of day and not at other times.

As shown in 630, an access control policy may be automatically generated that permits access only to the subset of the services and resources that were actually used by the application or user(s) during the learning mode. The analysis performed in 620 may be used by a policy generator to automatically create an access control policy of appropriately restricted scope. The restricted access control policy may include a set of permissions or privileges to allow access to only a portion of the services and resources or with other access restrictions (e.g., with access permitted only at certain times of day). The restricted policy may reflect the actual, observed access patterns of the application or user(s) over the course of the learning mode.

As shown in 640, the access control policy may be attached to a role. The role may be associated with one or more users or user groups that execute the application. The role offering more restricted access may be used by the application or user(s) during continued execution beyond the learning mode. In one embodiment, the restricted policy may be automatically attached to the role associated with the developers or other team that owns the application. In one embodiment, the restricted policy may be attached to the role based (at least in part) on user input. For example, a description of the restricted policy may be provided to a user associated with the application, and user input may be solicited to approve or deny the auto-generated policy for the application. However, the user need not manually write the policy. As shown in 650, the application may be executed using the role or the user(s) may continue to access the subset of services and resources using the role. For example, the application may be deployed to a production environment where it can use the role to access only to the subset of the services and resources that were actually used by the application during the learning mode.

Illustrative Computer System

In at least some embodiments, a computer system that implements a portion or all of one or more of the technologies described herein may include a computer system that includes or is configured to access one or more computer-readable media. FIG. 7 illustrates such a computing device 700. In the illustrated embodiment, computing device 700 includes one or more processors 710A-710N coupled to a system memory 720 via an input/output (I/O) interface 730. Computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). Processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In multiprocessor systems, each of processors 710A-710N may commonly, but not necessarily, implement the same ISA.

System memory 620 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code (i.e., program instructions) 725 and data 726. In the illustrated embodiment, system memory 720 also stores program code and data that implement aspects of the access control management system 100 discussed above.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processors 710A-710N.

Network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. For example, system memory 720 may store program code and data associated with the access control management system 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 700 via I/O interface 730. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. Further, a computer-readable medium may include transmission media or signals such as electrical, electromagnetic, or digital signals, conveyed via a communication medium such as a network and/or a wireless link, such as may be implemented via network interface 740. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
 a multi-tenant provider network that provides a plurality of services and resources in a production environment; and
 one or more computing devices configured to implement an access control management system, wherein the access control management system is configured to:
  initiate a learning mode associated with execution of an application in a pre-production environment in which the application is isolated from client traffic in the production environment and tested using historical or synthetic traffic, wherein the pre-production environment enables the application to access the services and resources provided in the production environment;
  monitor a plurality of access requests to the services and resources by the application tested using the historical or synthetic traffic during the learning mode;
  after termination of the learning mode, perform an analysis of the monitored access requests by the application tested using the historical or synthetic traffic during the learning mode, wherein the analysis of the access requests determines which of the services and resources were used by the application during the learning mode so as to generate a subset of the services and resources to include the determined one or more services and resources;
  generate an access control policy based at least in part on the analysis of the access requests, wherein the access control policy permits access to the subset of the services and resources that was used by the application during the learning mode; and
  attach the access control policy to a role associated with the application in the production environment, wherein the application is executed in the production environment with the permitted access to the subset of the services and resources according to the access control policy attached to the role.

2. The system as recited in claim 1, wherein the access control management system is further configured to:
 generate a broad access control policy, wherein the broad access control policy permits access to the plurality of services and resources during the learning mode; and
 attach the broad access control policy to the role associated with the application in the pre-production environment.

3. The system as recited in claim 1, wherein the access control management system is further configured to:
provide, to a client associated with the application, a description of the access control policy; and
receive, from the client, input approving the access control policy, wherein the access control policy is attached to the role associated with the application based at least in part on receipt of the input.

4. The system as recited in claim 1, wherein the access control management system is further configured to:
determine a plurality of additional access requests to the subset of the services and resources by the application during execution of the application in the production environment; and
based at least in part on additional analysis of the additional access requests, remove from the role one or more permissions to access one or more of the subset of the services and resources.

5. A computer-implemented method, comprising:
providing a plurality of services and resources in a production environment of a multi-tenant provider network;
determining a plurality of access requests to the plurality of services and resources by a software product during execution of the software product in a learning mode associated with a pre-production environment in which the software product is isolated from client traffic in the production environment and tested using historical or synthetic traffic, wherein the pre-production environment enables the application to access the plurality of services and resources provided in the production environment;
determining which of the services and resources were used by the software product tested using the historical or synthetic traffic during the learning mode so as to generate a subset of the services and resources to include the determined one or more services and resources;
generating a set of permissions that permits access to the subset of the services and resources used by the software product during the learning mode; and
attaching the set of permissions to a role associated with the software product.

6. The method as recited in claim 5, wherein the is associated with the software product in the production environment.

7. The method as recited in claim 5, further comprising:
generating an initial set of permissions, wherein the initial set of permissions permits access to the plurality of services and resources; and
attaching the initial set of permissions to the role associated with the software product during execution of the software product in the learning mode.

8. The method as recited in claim 5, further comprising:
providing, to a client associated with the software product, a description of the set of permissions; and
receiving, from the client, input approving the set of permissions, wherein the set of permissions is attached to the role associated with the software product based at least in part on the input.

9. The method as recited in claim 5, further comprising:
determining a plurality of additional access requests to the subset of the services and resources by the software product during execution of the software product in the production environment; and
based at least in part on additional analysis of the additional access requests, removing from the role one or more permissions to access one or more of the subset of the services and resources.

10. The method as recited in claim 5, wherein the set of permissions disallows access to a second subset of the services and resources not used by the software product during the learning mode.

11. The method as recited in claim 5, wherein the software product is executed in the learning mode for a predetermined duration of time, and wherein the learning mode is terminated after the predetermined duration of time.

12. The method as recited in claim 11, further comprising:
receiving, by the access control management system from a client, a selection of the predetermined duration.

13. The method as recited in claim 5, further comprising:
determining that an individual resource of the subset of the services and resources was not used by the software product over a period of time; and
providing, to a client, a recommendation to deprovision or delete the individual resource.

14. One or more non-transitory computer-readable storage media storing program instructions that, when executed on or across one or more processors, perform:
providing a plurality of services and resources in a production environment of a multi-tenant provider network;
determining a plurality of access requests to the plurality of services and resources by an application during a learning mode associated with execution of the application in a pre-production environment in which the application is isolated from client traffic in the production environment and tested using historical or synthetic traffic, wherein the application is associated with a user account, and wherein the pre-production environment enables the application to access the plurality of services and resources provided in the production environment;
determining which of the plurality of services and resources were used by the user account tested using the historical or synthetic traffic during the learning mode so as to generate a subset of the services and resources to include the determined one or more services and resources;
generating an access control policy that permits access to the subset of the services and resources used by the user account during the learning mode; and
attaching the access control policy to a role associated with the user account, wherein the user account is permitted to access the subset of the services and resources according to the access control policy attached to the role.

15. The one or more non-transitory computer-readable storage media as recited in claim 14, wherein the plurality of access requests are generated using one or more interfaces to the plurality of services and resources.

16. The one or more non-transitory computer-readable storage media as recited in claim 14, further comprising additional program instructions that, when executed on or across the one or more processors, perform:
generating an unrestricted access control policy, wherein the unrestricted access control policy permits access to the plurality of services and resources; and
attaching the unrestricted access control policy to the role associated with the user account during the learning mode.

17. The one or more non-transitory computer-readable storage media as recited in claim 14, further comprising additional program instructions that, when executed on or across the one or more processors, perform:
- providing, to a client, a description of the access control policy; and
- receiving, from the client, input approving the access control policy, wherein the access control policy is attached to the role associated with the user account based at least in part on the input.

18. The one or more non-transitory computer-readable storage media as recited in claim 14, further comprising additional program instructions that, when executed on or across the one or more processors, perform:
- determining a plurality of additional access requests to the subset of the services and resources by the user account after termination of the learning mode; and
- based at least in part on additional analysis of the additional access requests, removing from the role one or more permissions to access one or more of the subset of the services and resources.

19. The one or more non-transitory computer-readable storage media as recited in claim 14, wherein the access control policy disallows access to a second subset of the services and resources not used by the application during the learning mode.

20. The one or more non-transitory computer-readable storage media as recited in claim 14, further comprising additional program instructions that, when executed on or across the one or more processors, perform:
- determining an abnormal access pattern by the user account during the learning mode; and
- reporting the abnormal access pattern.

* * * * *